United States Patent [19]

Itoh

[11] Patent Number: 4,671,881
[45] Date of Patent: Jun. 9, 1987

[54] SEWAGE TREATMENT PROCESS

[75] Inventor: Yuichiro Itoh, Yamato, Japan
[73] Assignee: Rasa Corporation, Tokyo, Japan
[21] Appl. No.: 758,022
[22] Filed: Jul. 23, 1985
[30] Foreign Application Priority Data Jul. 24, 1984 [JP] Japan .................................. 59-152113

[51] Int. Cl.⁴ .............................................. C02F 1/54
[52] U.S. Cl. .................................... 210/703; 210/710; 210/769
[58] Field of Search ................. 210/703, 710, 769–771, 210/714, 668, 691, 694, 764

[56] References Cited

U.S. PATENT DOCUMENTS 4,065,385  12/1977  Aktay et al. ........................ 210/703
4,104,128   8/1978  Faber et al. ..................... 210/703 X
4,175,035  11/1979  Moyer ............................. 210/703 X
4,321,151   3/1982  McMullen ....................... 210/771 X Primary Examiner—Tom Wyse
Attorney, Agent, or Firm—Staas & Halsey

[57] ABSTRACT

Coal pulverized by a mill or crusher is used as a floating agent which is charged into a floating machine, together with wastewater, for example, from a wastewater treatment facility or homes which produce organic substances such as human wastes. The pulverized coal and wastewater are mixed and uniformly stirred by a stirrer in the form of an impeller or a cyclone separator while being aerated. The produced floating floc is discharged from an upper portion of a first floating machine, whereas sedimented materials are discharged from a lower portion of the first floating machine. The same process is repeated in other floating machines connected in series to the above-described first floating machine. The collected floating flocs are dewatered to produce solid cakes which are used as a fuel. The water which has been extracted to form the solid cake, is purified and discharged.

14 Claims, 1 Drawing Figure

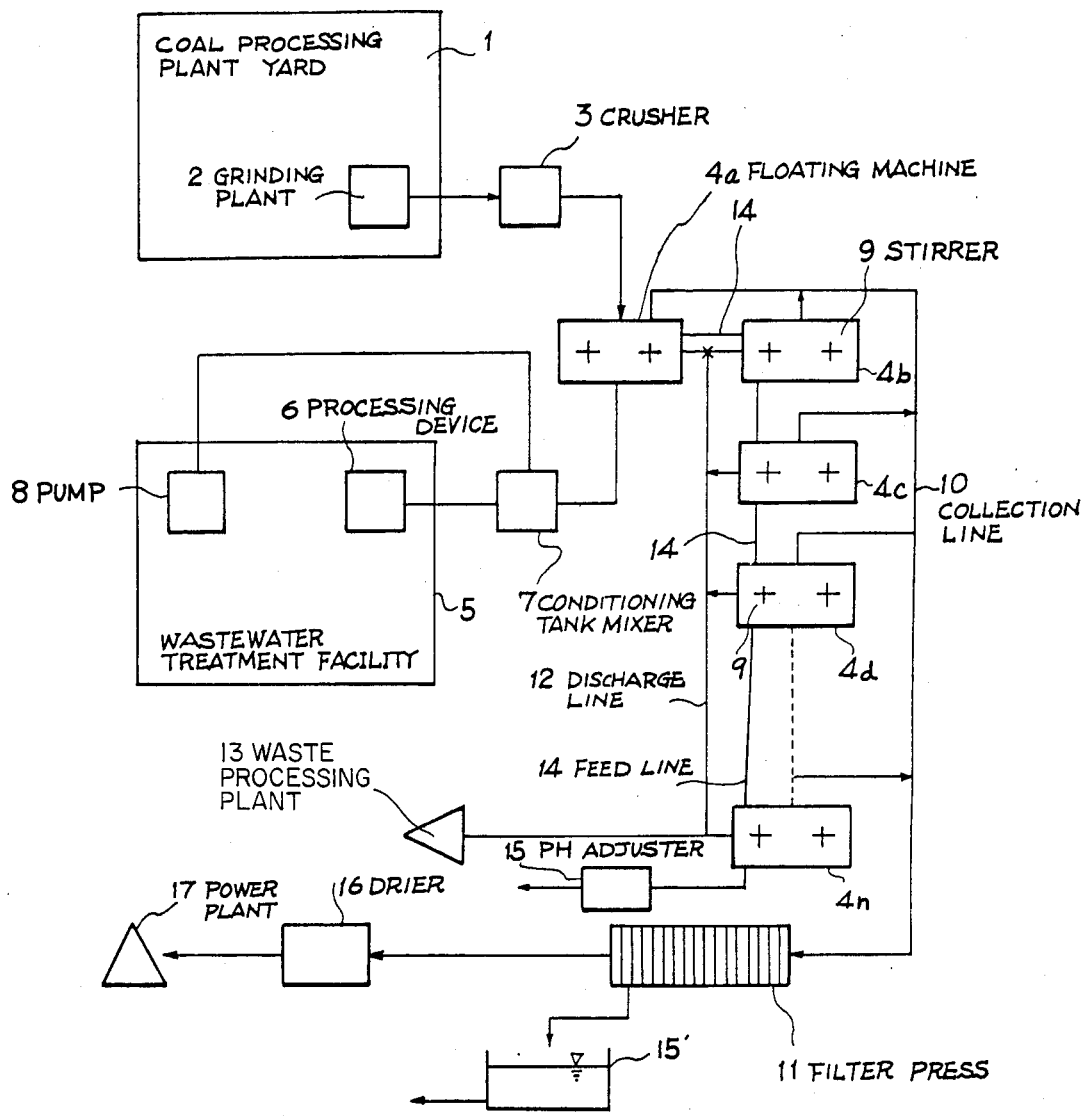

SEWAGE TREATMENT PROCESS

BACKGROUND OF THE INVENTION

The present invention relates to a sewage treatment process, and more particularly to such a process for forming a solid fuel material from wastewater containing organic substances such as human wastes, and effectively utilizing the solidified fuel material.

Wastewater including drainage water discharged from homes such as human wastes is generally treated by the standard activated sludge process since the wastewater contains organic substances. In the activated sludge process, the wastewater is passed through a coarse screen to allow sludge to be gravity-settled in a settling basin, and then is passed through a finer screen for further settling sludge, after which the wastewater flows through a preliminary aeration tank into a final setting basin in which sludge is settled. The treated water separated from the sludge is passed from the final setting basin through an aeration tank into a chlorination chamber from which the sterilized water is discharged. The collected sludge is thickened by processing the same through a concentration tank and a sludge storage tank and delivering the sludge to a sludge mixing tank in which the sludge is concentrated uniformly. The concentrated sludge is then pumped from a supply tank to a filter press which separates a solid cake from the sludge. The solid cake is delivered by a belt conveyor, for example, and will be incinerated.

In the foregoing known treatment process, it takes a long time to settle the slurry containing organic substances since the organic substances have an extremely small specific gravity and a high water content. The sludge thickening is also time-consuming because the dewatering process is complex. The incineration of the solid cake requires a large amount of high-heat-capacity fuel such as coal.

The conventional sewage treatment process has therefore been disadvantageous in that it involves a number of steps since it is time-consuming for the organic substances to settle, and a complex dewatering process is required for concentrating the sludge, resulting in a high cost of sewage treatment. For increasing the dewatering rate, a dewatering agent such as slaked lime or ferric chloride, has been added. However, the use of such a dewatering agent increases the amount of inorganic substances in the treated sludge which leads to secondary pollution, and requires an increased amount of water to be used in the process.

It has recently been known to employ pulverized coal for its absorption ability or to add a high-polymer flocculation agent for facilitating and accelerating the dewatering and thickening of the sludge, and to use the produced cake finally as a secondary fuel, utilizing the latent combustion heat of the pulverized coal. However, the sludge cannot easily be settled due to the floating property of the pulverized coal. Since the sludge has to be mixed during the process, ion-based organic substances such as cation and anion are increased in amount, resulting in an additional secondary processing step. Therefore, the above known method cannot meet desired economical requirements, although the time required for dewatering the sludge can be shortened and the cake has a lowered water content.

The recent trends in treating wastewater are not confined to the processing of drainage water only, but toward economical treatment processes which effectively utilize water and solid materials produced by processing the wastewater. From this standpoint, the conventional wastewater treatment process employing pulverized coal has proven unsatisfactory in that the pulverized coal is used only as a dewatering agent, and the high cost required of treating the wastewater cannot be recovered.

There has been an attempt to employ a pressure floating method to meet the economical requirements. However, it is relatively complex to select a reagent and a selected reagent has to be consumed in an extremely large quantity. Therefore, this method is also economically problematic.

SUMMARY OF THE INVENTION

It is an object of the present invention to provide a sewage treatment process which will eliminate the foregoing problems with the conventional sewage treatment process.

Another object of the present invention is to provide a sewage treatment process which utilizes the floating and absorbing capabilities of pulverized coal to float organic substances in wastewater.

Still another object of the present invention is to provide a sewage treatment process for producing fuel materials used in heat power plants from wastewater effectively and economically.

A still further object of the present invention is to provide a sewage treatment process capable of processing wastewater into fuel materials which can be combusted without producing undesirable odor.

According to the present invention, wastewater containing organic substances and a floating agent composed of pulverized coal are mixed in a floating machine, and the mixture is stirred by a stirrer, such as an impeller or a cyclone separator, to produce a floating floc composed of the organic substances absorbed and floated by the pulverized coal. The floating floc then overflows the floating machine, while any sedimented materials are discharged from a lower portion of the floating machine. The residual slurry is fed to a next floating machine wherein the above process is repeated. The floating flocs discharged from the floating machines are collected and dewatered to produce dried cakes which will be combusted in a heat power plant to generate electric power. The combustion energy of the pulverized coal and the organic substances in the cakes allows them to be combusted sufficiently, and the odor which would be produced by the organic substances is eliminated when they are combusted.

More specifically, wastewater discharged from a wastewater treatment facility or homes is charged into the floating machine which is supplied with the pulverized coal having a particle size of about 2 mm or in the range of from 180 to 230 meshes, and also with a prescribed amount of air. The mixture is stirred in the floating machine by the stirrer, such as the impeller or vortex flow produced by the cyclone separator. As a result, the slurry and air bubbles are caused to impinge upon each other to allow the pulverized coal to absorb the organic substances and float the same to produce the floating floc. During this process, the air bubbles are scattered around by the stirring forces of the impeller or the intensive vortex flow pattern to keep the slurry free from erratically varying in surface level and to cause the air bubbles to impinge upon pulps in contained the organic substances with a sufficiently large amount of energy. The floating floc is discharged as an overflow from the floating machine, whereas the sedimented materials, such as earth and sand and ores, are discharged from the lower portion of the floating machine. The remaining slurry is supplied to the next floating machine in which it is subjected to the foregoing process. The floating flocs discharged from the floating machines are collected. The residual slurry is finally turned into water that is sterilized and adjusted in pH, after which the water is discharged. The collected flocs are sufficiently concentrated and dewatered, for example, by a filter press, to produce a bulk or solid cake composed of pulverized coal and organic substances. The bulk will be used as a fuel material combusted in the heat power plant. The pulverized coal and organic substances are sufficiently combusted due to their latent combustion energy, and any substances liable to produce unwanted odor are also combusted at the same time. Therefore, the ambient air around the heat power plant is free from pollution. The cost of the sewage treatment can be recovered by the fuel produced by the sewage treatment process for use in the heat power plant.

Therefore, the organic substances contained in the wastewater can be reused as a source of energy, without producing additional wastewater, by floating them as a floc with the pulverized coal and processing the floc into a fuel cake to be used in the heat power plant.

The pulverized coal is used not only as a dewatering agent to assist the slurry in getting dewatered and as an auxiliary fuel for incinerating the slurry, but also as a fuel to be combusted with the organic substances to produce energy for electric power generation. Therefore, the value of the pulverized coal can be utilized effectively and completely.

Since the solid slurry component of the wastewater can be used as a fuel, any substances contained therein for producing odor can also be combusted completely. As a result, no malodorous problem occurs around the heat power plant.

A plurality of floating machines are connected in series for concentrating floating flocs discharged therefrom, so that the residual slurry from the floating machines can finally be turned into water which is sterilized and adjusted in pH before it is discharged into a river. Therefore, the sewage treatment process of the invention produces no secondary pollution.

The sewage treatment system for carrying out the process of the invention is simple and inexpensive to construct. By reusing the flocs as a source of energy, the cost of sewage treatement can be lowered. Consequently, the sewage treatement process can meet desired economical requirements.

The ratio at which the pulverized coal is to be mixed with the slurry which will be reused as an energy source need not be determined strictly.

In conventional sewage treatment systems, the cost of pulverized coal has been added only as part of the treatment cost, and has not been recovered. The sewage treatment process of the invention is cost-effective since the pulverized coal is used not only as a floating agent but also as a fuel itself.

The series-connected floating machines allow the floating flocs to be dewatered efficiently, and hence the filter press for dewatering the collected flocs operates highly efficiently to produce solid cakes. The cost of electric power consumed by the filter press is therefore lowered.

The sewage treatement process of the invention is therefore capable of reusing resources which can be recycled as energy sources. The steps of floating and dewatering the floc are effected highly efficiently in short periods of time. Therefore, the cost of sewage treatment is reduced, and the sewage treatement system is compact and can be easily controlled.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWING

The sole figure is a flow diagram for explaining the sewage treatment process of the present invention.

DESCRIPTION OF THE PREFERRED EMBODIMENT

As shown in the sole figure, a coal processing plant yard 1 which is preferably located in a suburban area, includes a grinding plant 2 for grinding low-quality coal having a high ore content to select coarse coals. The selected coarse coals are then crushed by a crusher 3, comprising a mill or a cone crusher, into fine particles having uniform sizes ranging from 180 to 230 meshes. The pulverized coal particles are then charged as a floating agent into a first floating machine 4a which is connected to an array of series-connected floating machines 4b, 4c, 4d . . . 4n.

A sewage treatment facility 5 which is also located in a suburban area, includes a processing device 6 for sterilization and pH control. Wastewater containing a large quantity of organic substances processed by the processing device 6, is charged through a known conditioning tank mixer 7 into the first floating machine 4a. At the same time, water is also charged from a pump 8 in the sewage treatment facility 5 through the conditioning tank mixer 7 into the first floating machine 4a. The relative amounts of the wastewater and water supplied from the processing device 6 and the pump 8, respectively, are determined by the conditioning tank mixer 7.

Small air bubbles having sizes in the range of 1.5 to 2.5 mm are produced in each of the floating machines 4a–4n. More specifically, each floating machine 4 has a stirrer 9 which may comprise a mechanical impeller or a cyclone separator. Where the mechanical impeller is employed, it rotates to shear self-supplied air or air supplied under pressure into small air bubbles. Where the cyclone separator is employed, air supplied under pressure and the solid-liquid mixture or slurry supplied under pressure cause violent cavitation to be formed by air vortexes and the slurry for dividing air into fine air bubbles. The flow of the slurry-air mixture is caused to impinge upon a baffle plate so as to form fine air bubbles having sizes ranging from 1.5 to 2.5 mm.

Each floating machine 4 causes the slurry to be aerated as a secondary effect of the floating process. Since the fine air bubbles in the floating machines 4 have a large total surface area and are well scattered around, the organic substances in the slurry can be brought into contact with the air bubbles much more effectively than would be possible with the conventional pressure floating process. The air bubbles, as they are scattered in the flow pattern thereof in the floating machine 4, are effective in aerating the slurry while they attract the solid particles and cause them to float.

In each of the floating machines 4, the pulverized coal, the wastewater, and the water charged therein are stirred by the stirrer 9. At the same time, the organic substances contained in the wastewater are aerated at the interfaces of the air bubbles. The air bubbles are highly scattered so that the slurry can be floated and separated without allowing settled organic particles including minute particles to be joined together. The surface of the liquid in each floating machine 4 is controlled to guard against variations in liquid level and hence breakage of floated and separated materials. Further, the stirrer 9 is controlled to cause the air bubbles and pulp components in the wastewater to impinge upon each other with as high energy as possible.

Where the cyclone separator is employed, it is required to supply a large quantity of air at a rate in the range of from 800 liters/min. to 1200 liters/min. so that the surface tension of the air bubbles is high and the air bubbles are scattered around to a high extent or floating and separating the organic substances highly efficiently.

Since the air bubbles produced are small in size and large in number, they have a large total surface area for contact with the slurry for an increased aerating efficiency.

In each of the floating machines 4, the organic substances in the stirred slurry are strongly attracted to the pulverized coal particles by their absorption ability, and are caused to float on the upper surface of the liquid in the floating machine 4 by the floating action of the pulverized coal particles. The organic substances are also caused to float under strong floating forces of the air bubbles, and then delivered from the floating machines 4 through a collection line 10 to a filter press 11 which separates a solid cake from a liquid.

Sedimented materials such as earth and sand, and ores other than the coal are discharged from each of the floating machines 4 through a discharge line 12 to a waste processing plant 13.

The floating machines 4 are interconnected in series by feed lines 14 so that the residual slurry can be successively supplied downstream to the floating machines 4. The residual slurry successively supplied to the floating machines 4 is stirred by the stirrers 9 therein to enable the solid organic substances to be attracted and floated by the floating agent. The floating organic substances overflow the floating machines 4 and are supplied from the collection line 10 to the filter press 11.

The separated floc discharged from each of the floating machines 4 is thickened to a high degree of concentration while it is supplied through the collection line 10 to the filter press 11. Therefore, the floc has a small water content immediately before it is supplied to the filter press 11.

The residual slurry flowing along the feed lines 14 through the floating machines 4 is finally turned into water which is sterilized and discharged via a pH adjuster 15 into a river.

The highly concentrated floc supplied to the filter press 11 is divided thereby into water and a solid cake which is compacted at a high concentration rate. The water from the filter press 11 is sterilized and discharged through a pH adjuster 15' into the river. The solid cake is delivered to a drier 16 which dries the cake naturally or forcibly, after which the cake is supplied to a heat power plant 17. In the heat power plant 17, the cake and general coals are combusted in a boiler furnace for generating electric power. The pulverized coal and the organic substances contained in the cake (i.e., the floc), are completely combusted as they have latent combustion energy. At the same time, substances which produce odor are also combusted in the boiler furnace, so that no malodorous problem is caused in the vicinity of the heat power plant 17.

The cost of the fuel consumed by the heat power plant 17 can be reduced, and the cost reduction results in a corresponding profit made by the sewage treatment plant. Therefore, the sewage treatment process of the present invention is cost-effective.

The sewage treatment process of the present invention is applicable not only to the treatment of wastewater discharged from the wastewater treatment facility, but also to the direct treatment of drainage water discharged from homes, or any wastewater containing organic substances which can be made available as fuel.

Although a certain preferred embodiment has been shown and described, it should be understood that many changes and modifications may be made therein without departing from the scope of the appended claims.

I claim:

1. A process for treating wastewater comprising the steps of:
   (a) mixing water, pulverized coal, and wastewater into a slurry in a floating machine;
   (b) stirring the slurry with a stirrer in the floating machine to extract a floating floc therefrom;
   (c) discharging the floating floc from an upper portion of the floating machine;
   (d) discharging a sedimented material from a lower portion of the floating machine;
   (e) discharging a residual slurry from the floating machine;
   (f) stirring the residual slurry discharged from the floating machine to extract a residual floating floc from the residual slurry by using at least one other stirrer in at least one other floating machine;
   (g) collecting the floating flocs discharged from the floating machines; and
   (h) dewatering the collected floating flocs to form a fuel bulk.

2. A process according to claim 1, wherein the wastewater is discharged from a wastewater treatment facility.

3. A process according to claim 1, further comprising the step fo combusting the fuel bulk in a heat power plant for generating electric power.

4. A process according to claim 1, further comprising the step fo aerating the slurry with the stirrers and the residual slurry in the floating machines.

5. A process according to claim 4, wherein said step (h) includes forcibly drying the collected floating flocs.

6. A process according to claim 5, further comprising the step of sterilizing water removed from the collected floating flocs in said step (h).

7. A process according to claim 6, further comprising the step of sterilizing the wastewater before it is mixed with the water and the pulverized coal in said step (a).

8. A process according to claim 7, further comprising the step of combusting the fuel bulk in a heat power plant for generating electric power.

9. A process according to claim 4, further comprising the step of adjusting the pH of water removed from the collected floating flocs in said step (h).

10. A process according to claim 9, further comprising the step of sterilizing the wastewater before it is mixed with the water and the pulverized coal in said step (a).

11. A process according to claim 1, wherein said step (h) includes forcibly drying the collected floating flocs.

12. A process according to claim 1, further comprising the step of sterilizing water removed from the collected floating flocs in said step (h).

13. A process according to claim 1, further comprising the step of adjusting the pH of water removed from the collected floating flocs in said step (h).

14. A process according to claim 1, further comprising the step of sterilizing the wastewater before it is mixed with the water and the pulverized coal in said step (a).

* * * * *

UNITED STATES PATENT AND TRADEMARK OFFICE
CERTIFICATE OF CORRECTION

PATENT NO. : 4,671,881
DATED     : JUNE 9, 1987
INVENTOR(S) : YUICHIRO ITOH

It is certified that error appears in the above-identified patent and that said Letters Patent is hereby corrected as shown below:

Col. 5, line 21, "or" should be --for--.

Col. 6, line 50, "fo" should be --of--;

line 53, "fo" should be --of--.

Signed and Sealed this

Third Day of November, 1987

Attest:

DONALD J. QUIGG

Attesting Officer

Commissioner of Patents and Trademarks